(12) United States Patent
Sunkavalli et al.

(10) Patent No.: US 11,488,342 B1
(45) Date of Patent: Nov. 1, 2022

(54) MATERIAL MAP IDENTIFICATION AND AUGMENTATION

(71) Applicant: ADOBE INC., San Jose, CA (US)

(72) Inventors: Kalyan Krishna Sunkavalli, San Jose, CA (US); Yannick Hold-Geoffroy, San Jose, CA (US); Milos Hasan, Oakland, CA (US); Zexiang Xu, San Jose, CA (US); Yu-Ying Yeh, La Jolla, CA (US); Stefano Corazza, Greenbrae, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/332,708

(22) Filed: May 27, 2021

(51) Int. Cl.
*G06T 15/04* (2011.01)
*G06T 15/00* (2011.01)
*G06K 9/62* (2022.01)
*G06N 3/04* (2006.01)

(52) U.S. Cl.
CPC ............ *G06T 15/04* (2013.01); *G06K 9/6215* (2013.01); *G06K 9/6226* (2013.01); *G06N 3/04* (2013.01); *G06T 15/005* (2013.01)

(58) Field of Classification Search
None
See application file for complete search history.

(56) References Cited

U.S. PATENT DOCUMENTS

| 11,069,119 | B1* | 7/2021 | Anderegg | G06T 15/005 |
| 2018/0253869 | A1* | 9/2018 | Yumer | G06N 3/0454 |
| 2019/0347526 | A1* | 11/2019 | Sunkavalli | G06N 3/084 |
| 2020/0201900 | A1* | 6/2020 | Sdorra | G06V 10/56 |
| 2021/0109987 | A1* | 4/2021 | Avila | G06T 17/20 |
| 2021/0274235 | A1* | 9/2021 | Anderegg | H04N 21/6587 |
| 2021/0350503 | A1* | 11/2021 | Hobson | G06T 9/00 |

OTHER PUBLICATIONS

Guilin Liu, Duygu Ceylan, Ersin Yumer, Jimei Yang, Jyh-Ming Lien, "Material Editing Using a Physically Based Rendering Network", 2017, Proceedings of the IEEE International Conference on Computer Vision (ICCV), 2017, pp. 2261-2269 (Year: 2017).*

* cited by examiner

*Primary Examiner* — Michael J Cobb
(74) *Attorney, Agent, or Firm* — Shook, Hardy & Bacon, LLP (57) ABSTRACT

Embodiments of the technology described herein, make unknown material-maps in a Physically Based Rendering (PBR) asset usable through an identification process that relies, at least in part, on image analysis. In addition, when a desired material-map type is completely missing from a PBR asset the technology described herein may generate a suitable synthetic material map for use in rendering. In one aspect, the correct map type is assigned using a machine classifier, such as a convolutional neural network, which analyzes image content of the unknown material map and produce a classification. The technology described herein also correlates material maps into material definitions using a combination of the material-map type and similarity analysis. The technology described herein may generate synthetic maps to be used in place of the missing material maps. The synthetic maps may be generated using a Generative Adversarial Network (GAN).

20 Claims, 8 Drawing Sheets

MATERIAL MAP IDENTIFICATION AND AUGMENTATION

BACKGROUND

Physically based rendering (PBR) is a computer graphics approach that seeks to render images or 3D models in a way that models the flow of light in the real world. Digital 3D models consist of 3D geometry as well as material specifications. High-quality 3D models also have high-quality physically-based material definitions that ensure that these models, when rendered, produced photorealistic results. Physically based rendering refers to the concept of using realistic shading/lighting models along with measured surface values to accurately represent real-world materials.

When rendering a low quality 3D model or model generated in a different program, the lack of material definitions or inaccurate linking of provided material definitions may produce a poor quality result that is not photorealistic. For example, the low quality 3D model may provide colors, but no materials or limited materials.

SUMMARY

Embodiments of the technology described herein, make unknown material-maps in a Physically Based Rendering (PBR) asset usable through an identification process that relies, at least in part, on image analysis. In addition, when a desired material-map type is completely missing from a PBR asset the technology described herein may generate a suitable synthetic material map for use in rendering. Thus, the technology described herein allows PBR assets with unknown or absent material maps to be rendered photorealistically.

Material maps can become unknown during an import or export process, during which the type (or class) of material map may be lost. For example, some PBR assets include links or references to the material-maps. These references may be understandable by the original application used to generate the asset, but are not understandable to the new application that imported the PBR asset. In this case, the bitmaps forming the material-maps are present, but identity information for the material maps is lost. The identify information that may be lost includes the material-map type and a unity or correlation between material maps.

"Material maps" (e.g., base color map, normal map, roughness map) as describe herein are a set of images, often bitmaps, that encode the reflectance properties of a material (e.g., its color, its geometry, its roughness). A group of material maps is used to define a material. As used herein, a group of material maps that are meant to define a single material may be described as a material definition.

In one aspect, the correct map type is assigned using a machine classifier, such as a convolutional neural network, which analyzes image content of the unknown material map and produce a classification. In other words, the bitmap content is the input to the machine classifier, rather than meta data for the material map. The machine classifier may use joint probability analysis when evaluating a group of unknown material maps that together form a material definition. The joint probability analysis is effective in these conditions because the material definition comprises only one material map of each type. A material definition will not include two material maps of the same type.

The technology described herein also correlates material maps into material definitions using a combination of the material-map type and similarity analysis. Embodiments of the material maps may be generated by a feature extractor and used to generate similarity scores. Clusters may be built using a base-color material map as a seed. Material maps of the other types are added to the cluster based on a similarity to the seed.

When one or more material maps are determined to be missing altogether, the technology described herein may generate synthetic maps to be used in place of the missing material maps. The synthetic maps may be generated using a Generative Adversarial Network (GAN).

DETAILED DESCRIPTION

Overview

Embodiments of the technology described herein, make unknown material-maps in a Physically Based Rendering (PBR) asset usable through an identification process that relies, at least in part, on image analysis. In addition, when a desired material-map type is completely missing from a PBR asset the technology described herein may generate a suitable synthetic material map for use in rendering. Thus, the technology described herein allows PBR assets with unknown or absent material maps to be rendered photorealistically.

Material maps can become unknown during an import or export process, during which the type (or class) of material map may be lost. For example, some PBR assets include links or references to the material-maps. These references may be understandable by the original application used to generate the asset, but are not understandable to the new application that imported the PBR asset. In this case, the bitmaps forming the material-maps are present, but identity information for the material maps is lost. The identify information that may be lost includes the material-map type and a unity or correlation between material maps.

"Material maps" (e.g., base color map, normal map, roughness map) as describe herein are a set of images, often bitmaps, that encode the reflectance properties of a material (e.g., its color, its geometry, its roughness). A group of material maps is used to define a material. As used herein, a group of material maps that are meant to define a single material may be described as a material definition. A single material may be rendered using a combination of material maps. For example, a single material meant to depict a first type of wood may include a base-color material map, a normal material map, a metallic material map, and a roughness material map. Material maps may be an input to a physically based rendering engine or other visual rendering system. To render the wood correctly, the rendering engine needs to know which material map is the base color, which is the roughness, and so on. The technology described herein can assign the correct type to each material-map in the PBR asset when the original type is missing or can't be understood.

In one aspect, the correct type is assigned using a machine classifier, such as a convolutional neural network, which analyzes image content of the unknown material map and produce a classification. In other words, the bitmap content is the input to the machine classifier, rather than meta data for the material map. The machine classifier may use joint probability analysis when evaluating a group of unknown material maps that together form a material definition. The joint probability analysis may be effective in these conditions because the material definition comprises only one material map of each type. A material definition may not include two material maps of the same type.

Identifying the correct type of material map is not the only problem encountered with unknown material maps. Many PBR assets comprise multiple material definitions, each comprising multiple material maps (typically at least four maps per definition). In this case, it is not clear which material maps correlate with each other to define a material. The technology described herein can group unknown material maps of different types together to form an accurate material definition.

The technology described herein correlates material maps into material definitions using a combination of the material-map type and similarity analysis. Embeddings of the material maps may be generated by a feature extractor and used to generate similarity scores. Clusters may be built using a base-color material map as a seed. Material maps of the other types are added to the cluster based on a similarity to the seed map.

When one or more material maps are determined to be missing altogether, the technology described herein may generate synthetic maps to be used in place of the missing material maps. The synthetic maps may be generated using a Generative Adversarial Network (GAN).

A PBR asset (e.g., file) may comprise geometry of an object and material maps of different types. The PBR asset may exist in any number of file formats, such as GL Transmission Format (glTF) or GLB format. The PBR asset includes one or more material-maps that are used to render a material correctly. The material-maps may be stored as a bitmap within the PBR asset or stored separately and referenced.

The different types of material maps can include base color, normal, roughness, metallic, height, opacity, glow, ambient occlusion, refraction, and self-illumination. Not all of the available types of material maps need to be present in every PBR asset. Aspects of the technology described herein can work with assets having different combinations of material-map types. Notice in the definitions provided below that many of the maps are greyscale or black and white. The similar format of the maps makes it challenging for a machine classifier to distinguish between these similar maps when they are unknown.

As used herein, a base color map (also called albedo) is a material-map type that indicates the base color of the entire material. For example, the base color of a 3D model of a blue car would be blue. The base color map may be a single color or flat light image of the pattern being created.

As used herein, a normal map is a material-map type that gives a material surface detail. This uses complex calculations to synthesize the way light interacts with the surface of material to generate smaller bumps and dents. The color of the normal map may be purple. RGB values are adjusted to produce cracks, bumps, or pores in the normal map.

As used herein, a roughness map (also called glossiness or microsurface scattering) is a material-map type that defines surface irregularities that cause light diffusion to produce either a rough or smooth appearance. The reflected direction may vary randomly based on the surface roughness. Roughness maps change light direction, but the light intensity remains constant. Rougher surfaces may have larger and dimmer-looking highlights. Smoother surfaces may keep specular reflections focused, which can appear to look brighter or more intense. The roughness may start at a value of zero which indicates light will not scatter at all, making the reflections and lighting much sharper and brighter on the material. On the other extreme, turning roughness up to full will result in the light being scattered around the material more. This makes lighting and reflections spread further around the model, but appear much dimmer.

As used herein, a metallic map is a material-map type that defines the metalness of the material. Metal maps may be grayscale, but in some instances, only white and black values are used. Black in the metallic map means the base color map will be used as the diffuse color (the color the material shows when hit with light). White will use the base color to define the color and brightness of the reflections, and set the material's diffuse color to black.

As used herein, a height map is a material-map type indicating height variations in a material. Height maps are similar to normal maps in that they are used to add smaller details into the base mesh. The big difference between the two is that instead of simulating the bumps and dips like a normal map, height maps will tessellate the mesh (increase the poly count) and actually add the data to the 3D mesh. Height maps may be a grayscale map with black representing the bottom of the mesh and pure white being the highest peaks, with shades of gray representing everything in between.

As used herein, an opacity map is a material-map type that allows portions of a material or material to be transparent. The opacity map can be used for glass or other translucent materials.

As used herein, a glow map is a material-map type that defines where light is emitted from an object. The glow map may not create a light source, but defines where the material will shine. The glow map may be a black and white image.

As used herein, an ambient occlusion map is a material-map type that defines how a surface reacts to light. The ambient occlusion map may be a grayscale map with white being an area that will pick up the most light with darker areas being more in shadow and less reactive to light.

As used herein, a refraction map is a material-map type that defines how light bends as it passes through an object. Refraction maps may be constant values. This means the refraction is consistent through the object.

As used herein, self-illumination map is a material-map type that indicates an amount of light emitted from an object. This may be used for objects that emit light, such as a smart phone screen.

System

Figure 1:
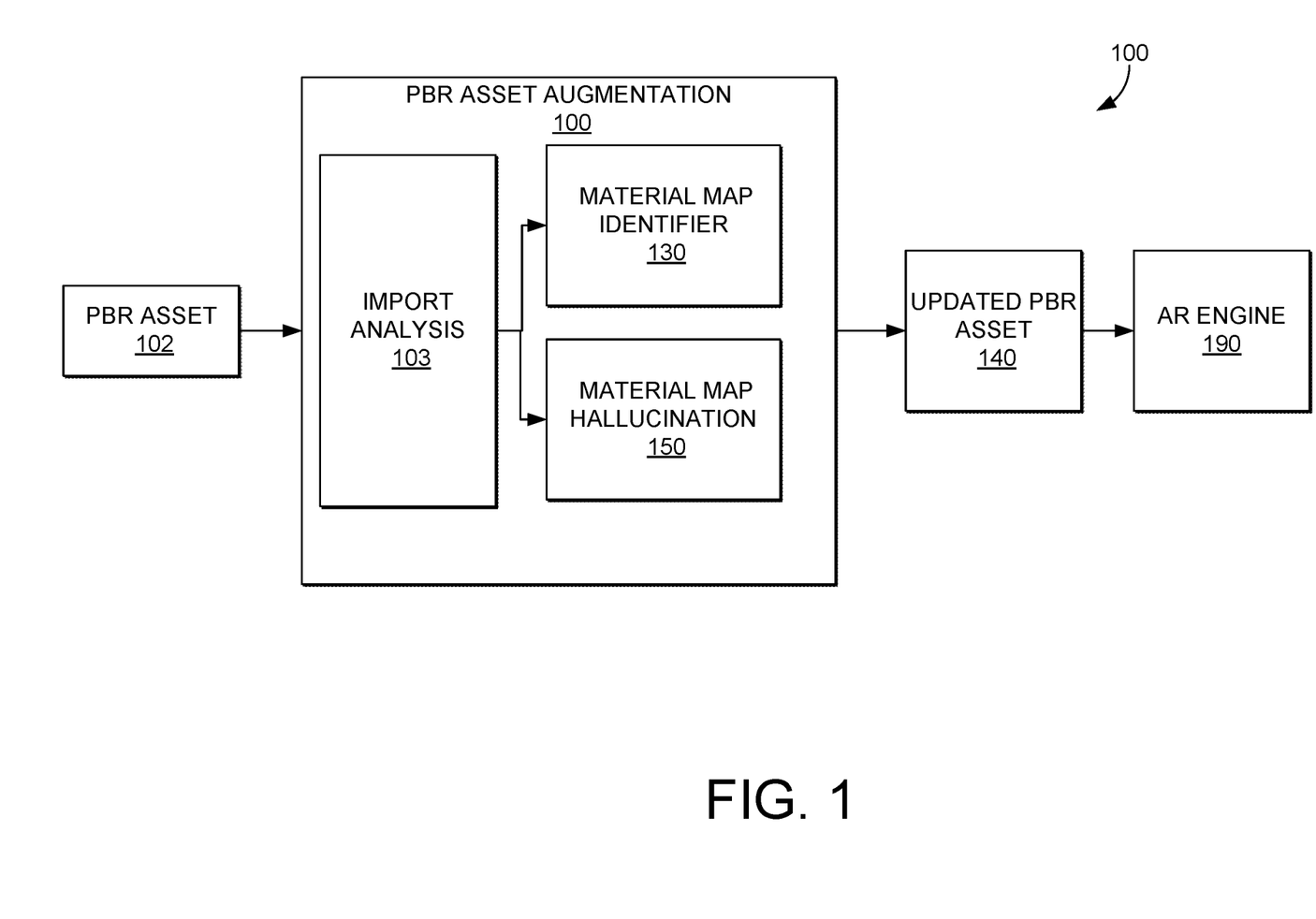
FIG. 1 provides a block diagram of providing an overview of a PBR system, in which embodiments described herein may be employed.

FIG. 1 illustrates an example PBR model environment 100 in which methods of the present disclosure may be employed. The PBR model environment 100 includes a PBR asset 102, a PBR asset augmentation component 101, an updated PBR asset 140, and augmented reality engine 190.

The PBR asset 102 includes a computer file or group of computer files that encode a model of an object. A PBR asset (e.g., file(s)) may comprise geometry of an object, lighting instructions, camera pose, and material maps of different types, in addition to other information. The PBR asset may be a file in any number of file formats, such as GL Transmission Format (glTF) or GLB format. The PBR asset includes one or more material-maps that are used to render a material correctly. The material-maps may be stored as a bitmap within the PBR asset or stored separately and referenced.

As an initial step, the PBR asset 102 is analyzed by the import analysis component 103 to determine if any material maps lack identification information or are entirely absent. Determining whether a material map lacks identification information can comprise determining whether a material-map type can be determined for each material map within the PBR asset 102. If a material-map type cannot be determined for one or more material maps within the PBR asset 102, then then the material map(s) without an identified type can be designated as unknown (or of an unknown type) and flagged for further analysis. Material maps with identified types may be described as known (or of a known type).

In addition to an unknown type, the material maps may be designated as having an unknown correlation to each other. A material may be defined or formed through the combination of multiple material maps of different types. A single material may not have multiple material maps of the same type. The four most common material maps used to define a material include the base-color material map, the roughness material map, the metallic material map, and the normal map. In one aspect, an unknown correlation is determined by the absence of correlation information in the asset. (In this case, correlation information that is present, but not understood by the AR engine 190 or otherwise translatable, is considered absent.)

In addition to the absence of correlation information, the presence of multiple material maps of the same type can further demonstrate an unknown correlation. For example, if the PBR asset 102 comprises 12 different material maps of four different types, then it is likely that three different materials are defined within the PBR asset 102. In this case, the material maps may be designated as lacking correlation information and flagged for further analysis. In the case where only four total material maps are associated with a PBR asset and each are of a different type, then a correlation may be assumed. Similarly, if the material maps are all of a different type, then a correlation may be assumed because the most likely result is that only a single material is defined by the asset.

The import analysis component 103 can also identify the complete absence of beneficial material maps. The use of the term beneficial indicates that the object may be rendered without certain material maps. However, the appearance of the object rendered without certain material maps may not be photorealistic. As mentioned, the rendering of many materials in a photorealistic way may utilize a minimum of four material maps. If less than four material maps are provided for each material in an object, then the one or more material map types that are not found within the PBR asset 102 may be designated as missing. Aspects of the technology described here in can synthesize the missing material map to improve the rendering quality of the object. The material-map hallucination component 150 generates the synthetic material map.

The material-map identifier 130 assigns a material-map type to unknown material maps associated with the PBR asset 102. The material-map identifier 130 can also identify correlation information for material maps that lack it. The result is an updated PBR asset 140 that includes material maps with a correctly assigned material-map type and correlation information. When material maps are completely absent, the updated PBR asset 140 can also include one or more synthetic material maps. The updated PBR asset 140 may be rendered by the augmented reality engine 190. The technology may be used with other rendering technology outside of the augmented reality space. The augmented reality engine 190 is simply provided as an example.

Figure 2:
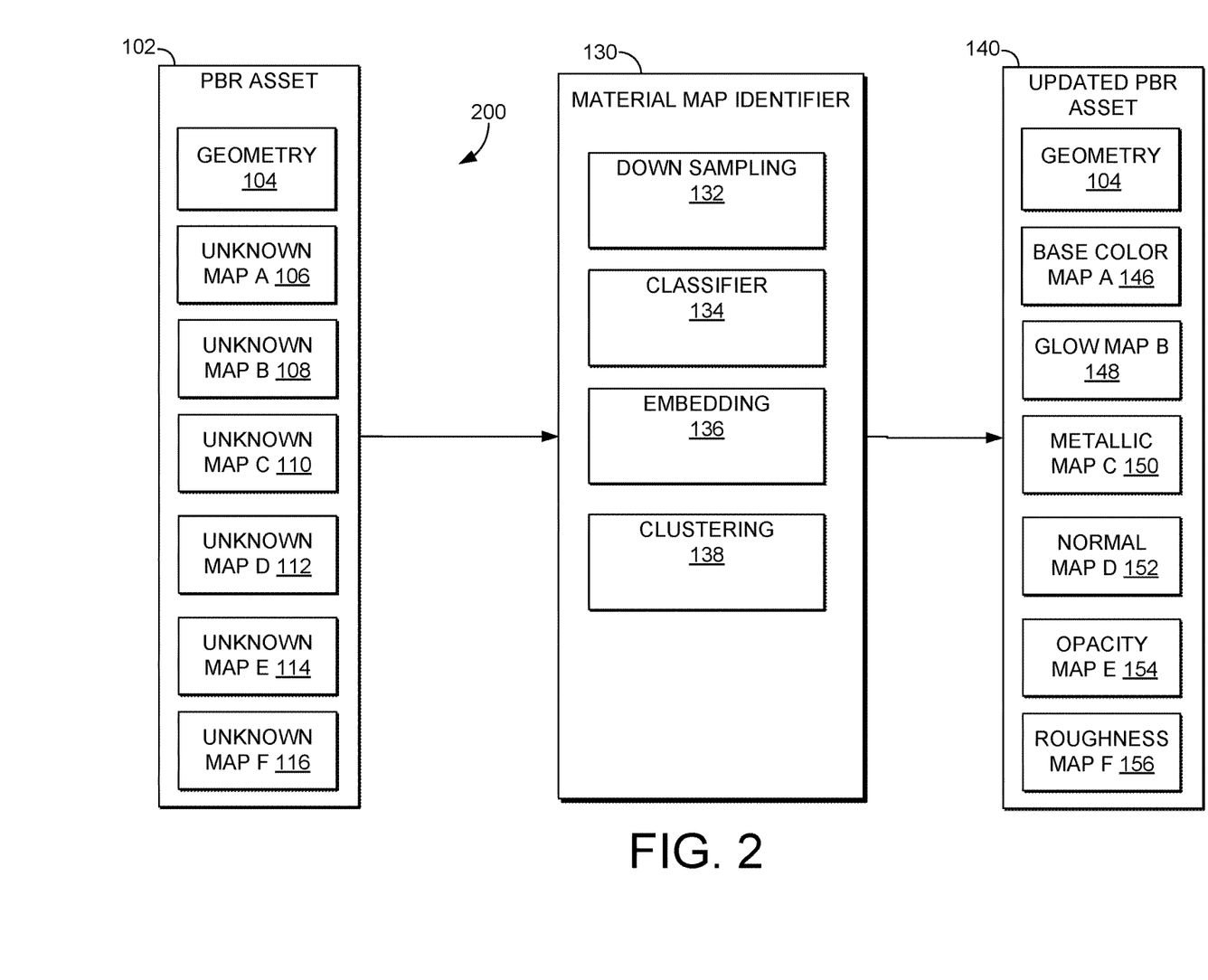
FIG. 2 is an illustration of a material-map classification system, in accordance with embodiments of the technology described herein.

Turning now to FIG. 2, a high-level material-map identification environment 200 in accordance with implementations of the present disclosure is shown. The material-map identification environment 200 includes the PBR asset 102, the material-map identifier 130, and the updated PBR asset 140. The material-map identification environment 200 operates on one or more computing devices that may include client-side devices and server-side devices. In aspects, operations may be split between client-side devices and server-side devices. Further, the components shown may interact with computing devices not shown in FIG. 2, such as user devices. For example, various user interfaces generated by, or with information generated by the components shown, may be displayed on a user device, such as a laptop.

It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Moreover, these components, functions performed by these components, or services carried out by these components are implemented at appropriate abstraction layer(s), such as the operating system layer, application layer, hardware layer, etc., of the computing system(s). Alternatively, or in addition, the functionality of these components and/or the embodiments of the technology described herein are performed, at least in part, by one or more hardware logic components. For example, and without limitation, illustrative types of hardware logic components include Field-programmable Gate Arrays (FPGAs), Application-specific Integrated Circuits (ASIC s), Application-specific Standard Products (ASSPs), System-on-a-chip systems (SOCs), Complex Programmable Logic Devices (CPLDs), etc. Additionally, although functionality is described herein regarding specific components shown in example environment 100, it is contemplated that in some embodiments functionality of these components are shared or distributed across other components.

Through not shown, a user device is any type of computing device capable of use by a user. For example, in one embodiment, a user device is of the type of computing device described in relation to FIG. 8 herein. In various embodiments, a user device is a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The PBR asset 102 has been described in brief; however, additional details are shown in FIG. 2. The details include a model geometry 104, an unknown material-map A 106, an unknown material-map B 108, an unknown material-map C 110, an unknown material-map D 112, an unknown material-map E 114, and unknown material-map F 116. The model geometry 104 is the shape of a 3D model. A 3D model may be a collection of points, lines, and planes. In 3D art, these are referred to as vertices, edges, and polygons (or faces). 3D geometries may be composed of thousands upon thousands of triangles or polygonal meshes. A 3D file format may compress this information and makes it machine-readable.

The material maps in the PBR asset 102 are unknown because a recognizable material-map type was not found to be associated with the material maps. As described previously, an import analysis component 103 may evaluate a PBR asset 102 to determine whether one or more material maps are associated with a material-map type. These are described as unknown material maps when no material-map type can be associated with material map. As mentioned, the material map is also described as unknown when it is associated with a material-map type that is unrecognizable by the application rendering the model from the PBR asset 102. This may happen when a model generated by a first application is imported into a second application for editing, rendering, or other purposes.

Figure 3:
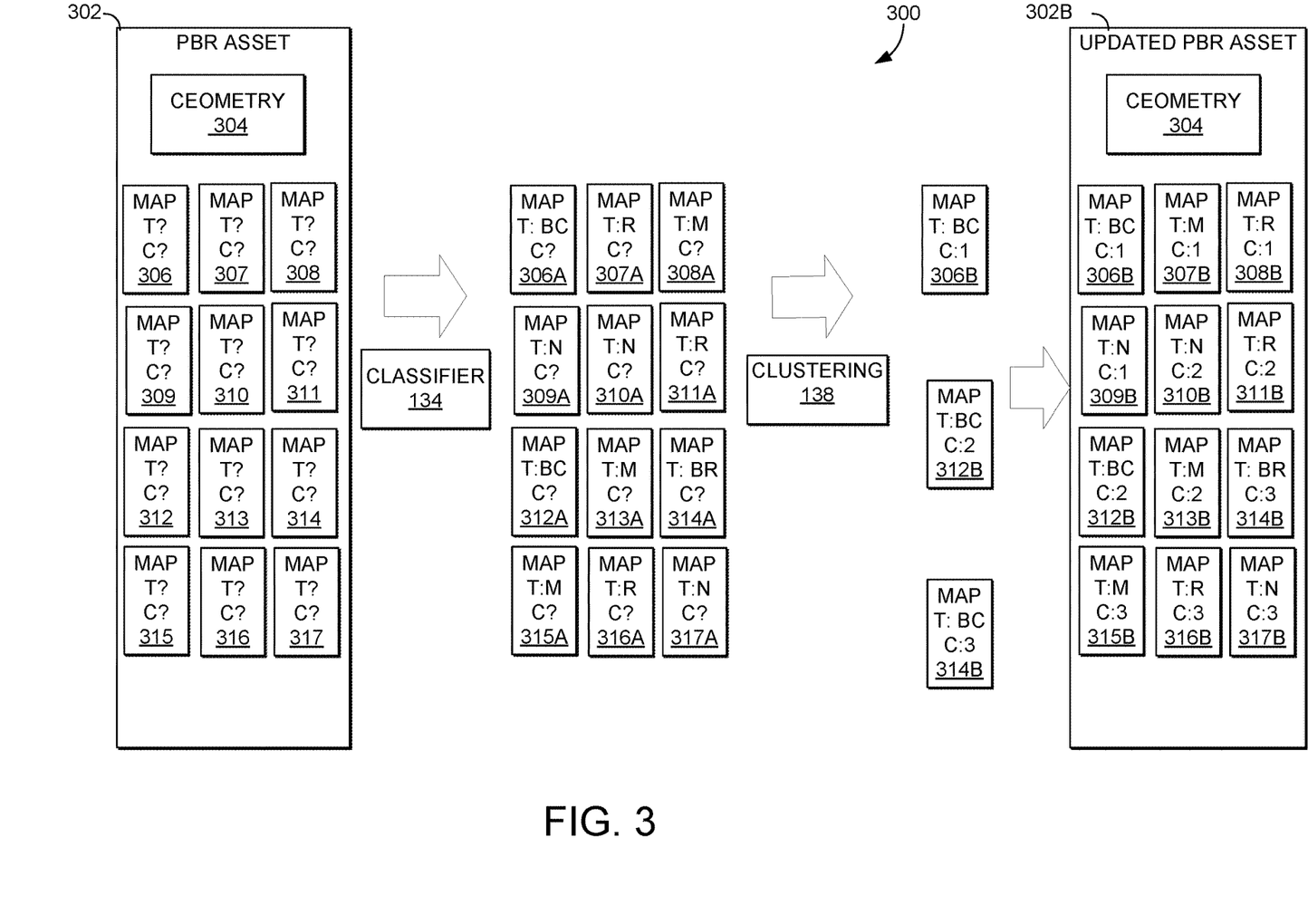
FIG. 3 is an illustration of material-map and clustering, in accordance with embodiments of the technology described herein.

Having determined that the PBR asset 102 includes unknown material maps, the PBR asset 102 is communicated to the material-map identifier 130 for processing. The material-map identifier 130 can identify the appropriate material-map type for an unknown material map. The material-map identifier 130 can also correlate related material maps when correlation information is missing. This presents three different scenarios that material-map identifier 130 can handle. The first scenario, which is illustrated in FIG. 2, is when the PBR asset 102 includes unknown material maps that are correlated. The second scenario is when the PBR asset 102 includes known material maps, but without correlation information. The third scenario, which is illustrated in FIG. 3, is when the PBR asset 102 includes unknown material maps that are also not correlated.

The material-map identifier 130 includes a down sampling component 132, a material-map type classifier 134, an embedding component 136, and a clustering component 138. The down sampling component 132 and the classifier 134 may be used in the first scenario. The embedding component 136 and the clustering component 138 may be used in the second scenario. All four components may be used in the third scenario, as described in FIG. 3.

The down sampling component 132 down samples high-resolution material maps into a lower resolution, such as 224×224. Down sampling is the reduction in spatial resolution while keeping the same two-dimensional (2D) representation. For example, columns and/or rows of pixels may be deleted or neighboring pixels averaged. Various methods of down sampling images exist, including bi-linear, bi-cubical, and nearest neighbor methods. The down sampling is a pre-processing step that can standardize the resolution of input images. The down sampled material map is communicated to the material-map type classifier 134.

The material-map type classifier 134 may be a neural network. As used herein, a neural network comprises at least three operational layers. The three layers can include an input layer, a hidden layer, and an output layer. Each layer is comprised of neurons. In this particular case, the input layer neurons receive a downscaled image of the unknown material map and pass data derived from the image to neurons in multiple hidden layers. Neurons in the hidden layers pass on the results of their computations to the additional layer, until the results get to the output layer, generally a softmax layer for multi-classification problems, such as image classification. The output layer then produces probability values for each individual pixel. Different types of layers and networks connect neurons in different ways.

Neurons have an intrinsic activation function that computes its output given an input (a vector of numbers) that is multiplied by another vector of numbers (called weights). The weights are the adjustable parameters that cause a neural network to produce a correct output given previous known matches between input-output, and are determined by the training process. For example, if a training image showed a material map designated (e.g., labeled) as a base-color material map, then the correct output would be for the network to show the label as a base-color material map. Once trained, the weight associated with a given neuron can remain fixed. The other data passing between neurons can change in response to a given input (e.g., material map to be classified). Retraining the network with additional training images can update one or more weights in one or more neurons.

The neural network may include many more than three layers. Neural networks with more than one hidden layer may be called deep neural networks. Example neural networks that may be used with aspects of the technology described herein include, but are not limited to, convolutional neural networks (CNN), such as a U-net, recursive neural networks, recurrent neural networks. The training implementation described subsequently uses a convolutional neural network, but aspects of the technology are applicable to other types of machine learning.

In each type of deep learning model, training is used to fit the model to the training data. In particular, weights associated with each neuron in the model can be updated through training. Originally, the initial model can comprise random weight values that are adjusted during training. Training in this context is done in multiple iterations, and each iterations comprises multiple steps: a forward pass, a loss function calculation (e.g., Cross-entropy loss) and backpropagation, where the weights are updated given errors made by the neural network during training. This process is repeated for multiple batches of training images. The goal is to update the weights of each neuron (or other model component) to cause the model to produce an output that maps to the correct material-map type label for as many images as possible. The training data comprises labeled images of material maps and may also include full models with associated material maps. For example, a material map labeled as normal material-map type may serve as training data. The training data may be annotated by humans. Each labeled image is input to the model and used to train it. Once a sufficient number of training images are fed to the model used by classifier 134 and the model stops improving or improves slowly during training, then the training can stop. The model can then be used to classify unlabeled images (e.g., material-maps not in the training set).

The material-map type classifier 134 may take the form a convolutional neural network. In one aspect, the classifier 134 may contain four 2D convolutional layers followed three fully-connected layers. Each convolutional layer may be followed by a rectified linear unit (ReLU) activation and a 2D max-pooling layer. Each fully-connected layer may be followed by a ReLU activation. A decision statistic may be generated by a softmax layer. The output may be described as a material-map type score. The material-map type score for a single material map can include a confidence score for each type of material map the classifier is trained to recognize.

The assignment of a material-map type can be obtained from the highest category probability for each map in the material-map type score. However, this sometimes classifies two unknown material maps into a single material type, which is definitely not true if both material maps are correlated into a single material definition, as is the case in FIG. 2. The material definition can comprise a plurality of related material maps, each of different types, but none of the same type. If the maps in the asset are uncorrelated as in FIG. 3, then multiple material maps may be classified into the same type and then need to be separated into their respective material definitions. Returning to FIG. 2, to enforce the constraint that only one unknown material map can be assigned to each category type, the technology may compute the joint probability for a set of unknown material maps and select the combination with the highest joint probability to assign the material-map type.

The result is an updated PBR asset 140. The updated PBR asset 140 includes base color map A 146, glow map B 148, metallic map C 150, normal map D 152, opacity map E 154, and roughness map F 156. As can be seen, a material-map type has been assigned to each of the unknown material maps. The maps themselves may be unchanged by the process. However, the previously unknown material maps are now assigned the correct label and can be used to render the model depicted in the updated PBR asset 140.

Turning now to FIG. 3, a high-level material-map identification environment 300 in accordance with implementations of the present disclosure is shown. Environment 300 illustrates scenario three described previously. In scenario three, the PBR asset 302 includes unknown material maps that are also not correlated into groups. The definition of a single material can be formed by a group of material maps. As mentioned, the definition of the single material will not include multiple material maps of the same material-map type. The scenario depicted in FIG. 3 shows how the classifier 134, the embedding component 136, and the clustering component 138 work together to assign material-map types to unknown material maps and develop correlations for the material maps.

The PBR asset 302 includes geometry 304, unknown material map 306, unknown material map 307, unknown material map 308, unknown material map 309, unknown material map 310, unknown material map 311, unknown material map 312, unknown material map 313, unknown material map 314, unknown material map 315, unknown material map 316, and unknown material map 317. The model geometry 304 is the shape of a 3D model. A 3D model may be a collection of points, lines, and planes. In 3D art, these are referred to as vertices, edges, and polygons (or faces). 3D geometries may be composed of thousands upon thousands of triangles or polygonal meshes. A 3D file format may compress this information and makes it machine-readable. The "TT" in each material map indicates the material-map type is unknown. Likewise, the "CT" in each material map indicates that the material map lacks correlation information.

A first step is to use the classifier 134 to assign a preliminary material-map type score to each of the material maps. As before, the material maps may be down sampled first. Use of the classifier 134 has been described previously, but it should be noted that the joint probability function may not be used in this implementation. The assumption behind the joint probability function is that only one of each material-type should be present in the plurality of unknown material maps evaluated. That assumption may not be valid for the scenario described in FIG. 3 because the plurality of unknown material maps in the PBR asset 302 might be from multiple material definitions. This means that multiple instances of the same material-map type may be found within the plurality of material maps being evaluated by the classifier 134. The preliminary material-map type score assigned to an individual material map may include multiple confidence scores indicating a strength of classification into one or more different types. The score is described as preliminary because it may be updated or confirmed in a subsequent step.

The result of the classification process is a plurality of material maps that each has a preliminary material map score associated with it. In FIG. 3, the highest type score for each material map is shown for the sake of illustration, but the score associated with each material map may in fact include indications of classification into other types of material maps. BC indicates base color, R indicates roughness, N indicates normal, and M indicates metallic. The plurality of preliminarily classified material maps includes BC material map 306A, R material map 307A, M material map 308A, N material map 309A, N material map 310A, R material map 311A, BC material map 312A, M material map 313A, BR material map 314A, M material map 315A, R material map 316A, and N material map 317A.

Once a preliminary type score is assigned to each material map, an embedding of each material map may be generated by the embedding component 136. The embedding may be used by the clustering component 138 to calculate a similarity score between material maps. The goal is to create embeddings that can project the maps within same material definition to closer points but project maps from different materials as far away as possible. In one aspect, a feature extractor is trained to learn this material embedding with triplet loss. Triplet loss is a loss function for machine learning algorithms where a baseline input is compared to a positive input and a negative input. The distance from the baseline input to the positive input is minimized, and the distance from the baseline input to the negative input is maximized. During training of the feature extractor, one map from a material may be sampled as anchor, another map from the same material sampled as positive, and another map from another material as negative. In particular, a negative sample within the same material map type as the anchor may be chosen as the hard negative sample. For example, the anchor and negative sample may both be base color maps, but from different materials.

Aspects may use a CNN as the embedder, with 4 2D convolutional layers followed by one fully-connected layer. Each convolutional layer may be followed by a ReLU activation and a 2D max-pooling layer. Each fully connected layer is followed by a ReLU activation. The output may be described as a feature vector.

Once the material embedding are generated, the clustering component 138 can apply k-Means clustering algorithm or some other similarity measure to identify similar material maps, which should be grouped together to define a material. In some aspects, selecting the top x similar material maps will result in an accurate grouping that reflects an intended material definition. However, this is not always the case. Using only the similarity score may not ensure only one material map of each type is mapped to a material grouping (e.g. two base colors are erroneously clustered to same material cluster).

To avoid this problem, the clustering component 138 can utilize both the classifier score and the embedding together. First, a material map classified as a base color is selected as a cluster centroid. In fact, each base-color material map may serve as a separate cluster centroid. Additional material maps may be assigned to the cluster sequentially. For example, a normal map may be assigned to the base color centroid with the smallest distance in the embedding space as measured by a similarity score. Material maps are added to the cluster in such a way that each cluster only includes one of each material-map type according to the preliminary classification.

In one aspect, material maps and the cluster are resubmitted to the classifier 134 for a final score. In this scenario, the joint probability method can be used to calculate a more accurate classification. This is beneficial, as some material maps may strongly correlate to each other as measured by similarity, but be difficult to classify by type. In other words, the preliminary classification may provide very similar confidence scores for multiple types. The ability to use the joint probability classification can improve the accuracy of the classification method and the resulting classification scores. Rerunning the classification process can confirm the existing classification or change the classification.

At the end of the process, the correlation is used to build material groups comprising material maps that correlate with each other to form a material definition. This correlation information is added to the material maps in the updated PBR asset 302B. The final material-map type classification is also added to the material map record. In the example shown in FIG. 3, the classification assigned to material map 307B and material map 308B changed from the preliminary assignment. The plurality of updated material maps in updated PBR asset 302B includes BC material map in cluster 1 306B, M material map in cluster 1 307B, M material map in cluster 1 308B, N material map in cluster 1 309B, N material map in cluster 2 310B, R material map in cluster 2 311B, BC material map in cluster 2 312B, M material map in cluster 2 313B, BR material map in cluster 3 314B, M material map in cluster 3 315B, R material map in cluster 3 316B, and N material map in cluster 3 317B. The updated PBR asset 302B may then be rendered.

Figure 4:
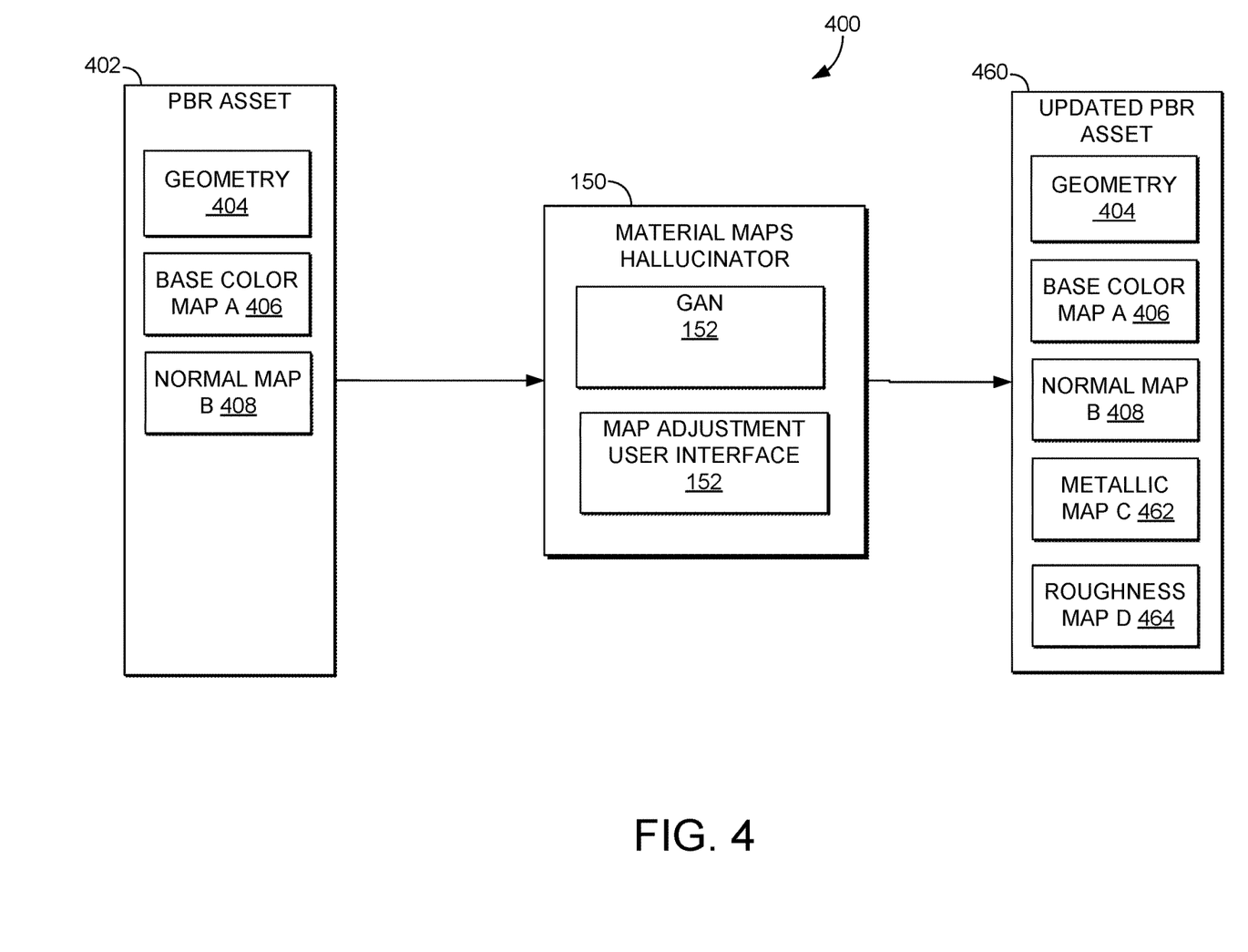
FIG. 4 is an illustration of material map hallucination, in accordance with embodiments of the technology described herein.

Turning now to FIG. 4, a high-level hallucination environment 400 in accordance with implementations of the present disclosure is shown. Hallucination environment 400 includes a PBR asset 402 and material-map hallucination component 150 in updated PBR asset 460. The PBR asset 402 includes geometry 404, a base color map A 406, and a normal map B 408.

As can be seen, the PBR asset 402 includes only two material maps. In one aspect, a determination has been made that one or more beneficial material maps are absent from the asset. In one aspect, material maps are determined to be missing when less than four material maps per material definition are included in an asset. In one aspect, material maps are determined to be missing when each material definition does not include a base color, normal, roughness and metallic material map. In the example shown in FIG. 4, the absence of two material map types is apparent. In other scenarios, the absence of material type is less apparent and may not become apparent until after the clustering process has been performed, as described previously. For example, seven material maps associated with an asset may be part of a single definition or two or more. If two or more, then material maps may be missing. For example, if the preliminary classification labels all seven of the maps as base color, then seven definitions may be associated with the asset and 21 maps are missing. The clustering process associates the material maps in an asset with each other in material definitions. Once the material definitions are formed, each definition can be evaluated for the absence of one or more beneficial material maps.

When one or more material maps are determined to be missing, the hallucination component 150 to generate synthetic maps of the missing material maps. In the example shown, a metallic material map and a roughness material map are missing. The synthetic maps may be generated using a Generative Adversarial Network (GAN). The GAN comprises two components—generator and discriminator. The generator aims at synthesizing realistic output that is hard for the discriminator to distinguish from actual outputs. The discriminator attempts to determine whether an input is real or synthesized from the generator. With adversarial training strategy to jointly train the generator and discriminator, the result is a generator that can synthesize very realistic material map outputs. Once trained, the generator can receive a base-color material mapping as input and generate a synthetic metallic, normal, and/or roughness map type. In one aspect, the generator takes a latent vector as input and produces the other maps. The goal of training is to find a latent vector that will produce a set of maps where the base color is similar to the known base color. The other maps may be generated from this latent vector. The generation of other map types is also possible. The generator works by attempting to minimize loss against the base-color material map when generating the other material maps in the material definition. When more than one material map for a material definition exits, the generator may attempt to minimize loss against all of the existing material maps.

The result is the updated PBR asset 460. The updated PBR asset 460 includes geometry 404, the base color map A 406, the normal map B 408, synthetic metallic map C 462, and synthetic roughness map D 464. The updated PBR asset 460 may be rendered.

The map-adjustment user interface 152 can show a version of the model rendered with the original PBR asset 402 and a second version rendered with the updated PBR asset 460. The user interface 152 can communicate to the user that the second version is rendered with synthetic material maps. The interface 152 can include an invitation and/or mechanism for the user to submit updated material maps to replace the synthetic material maps. For example, an original PBR asset might have included material maps that have been lost at some point during the import/export process. A user may go back and manually find these material maps and add them to the updated PBR asset 460 through the user interface 152.

Exemplary Methods

Figure 5:
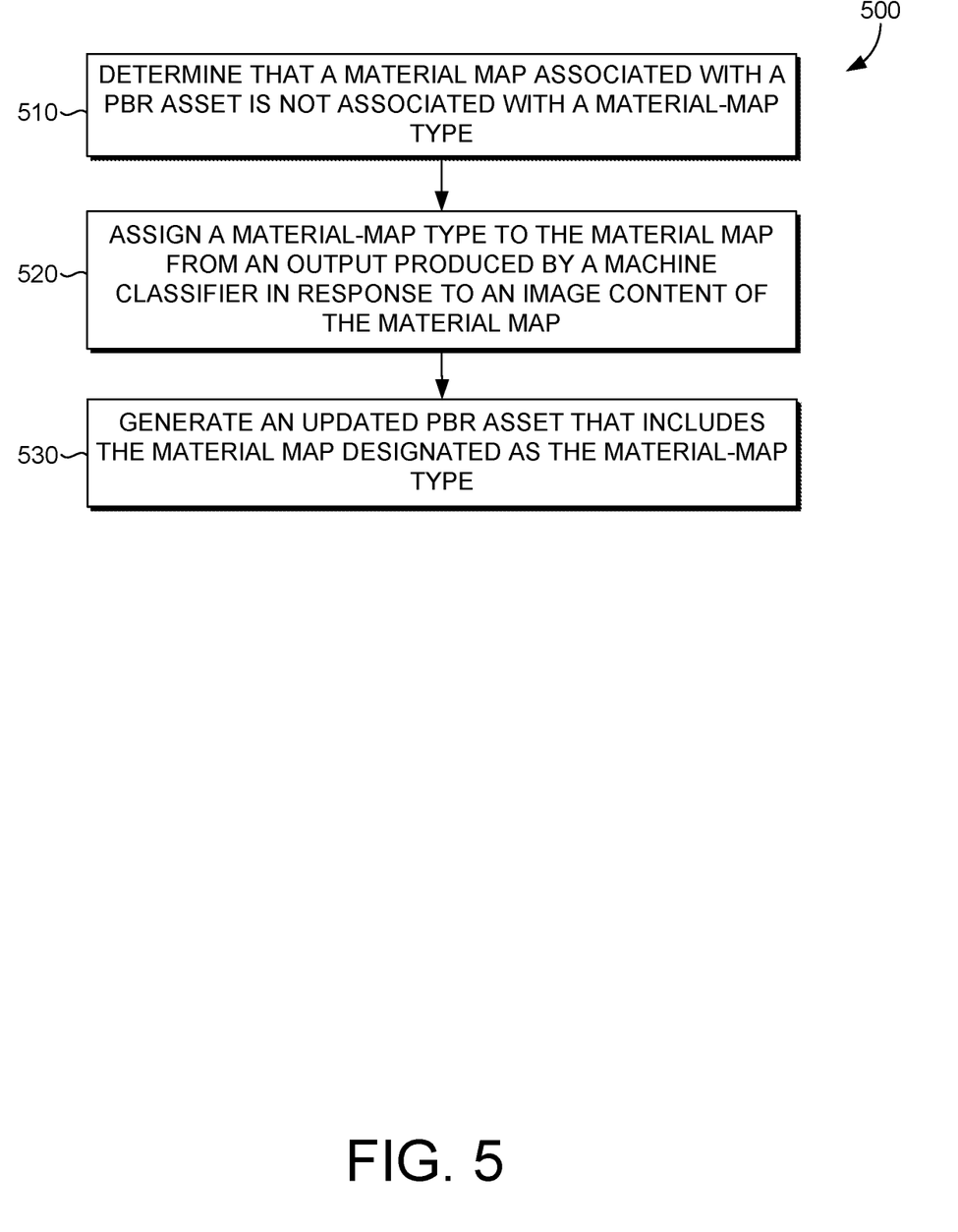
FIG. 5 provides a first example method of assigning a type to unknown material maps in a PBR asset, in accordance with embodiments of the technology described herein.
Figure 6:
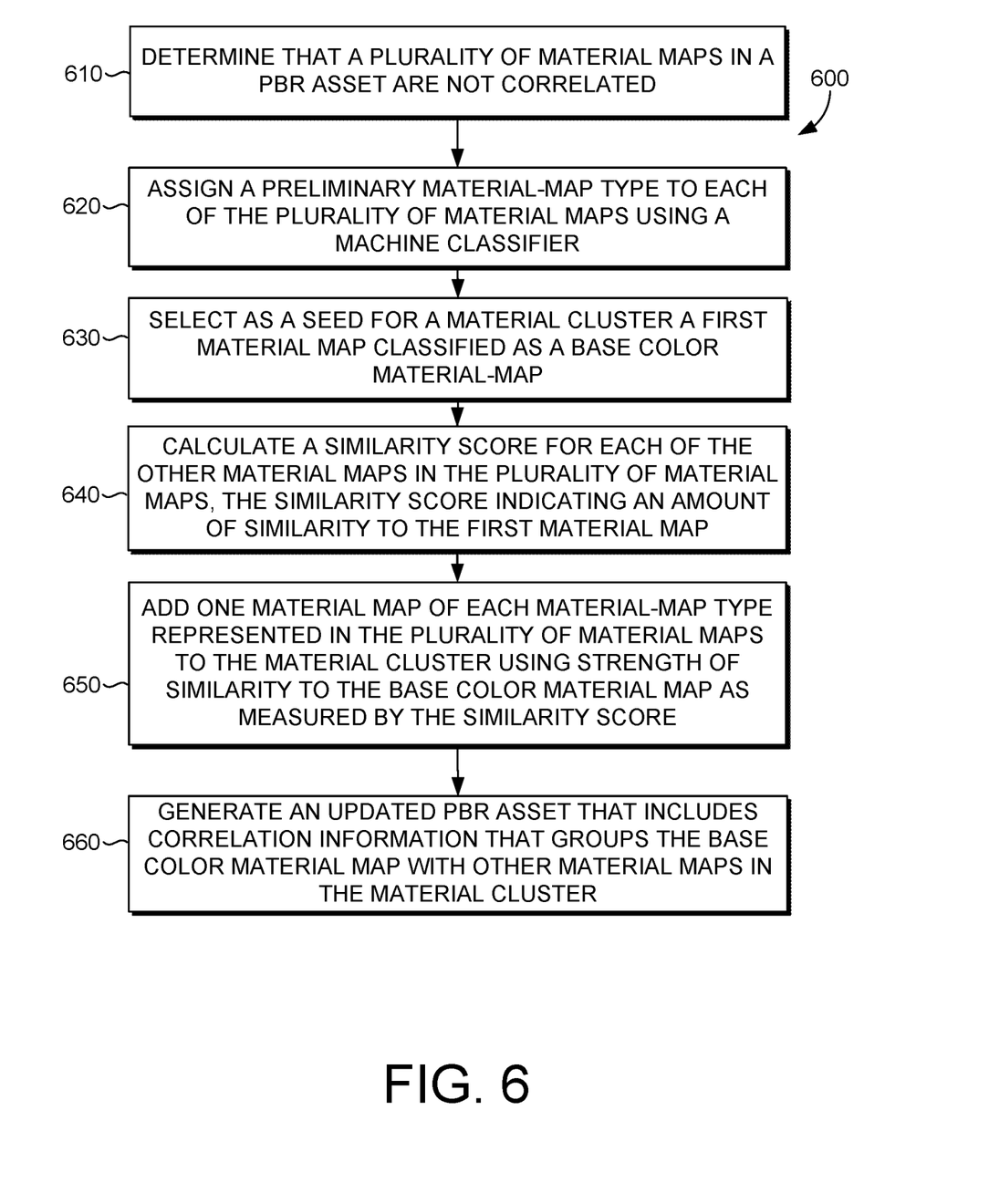
FIG. 6 provides a second example method of correlating material maps in a PBR asset, in accordance with embodiments of the technology described herein.
Figure 7:
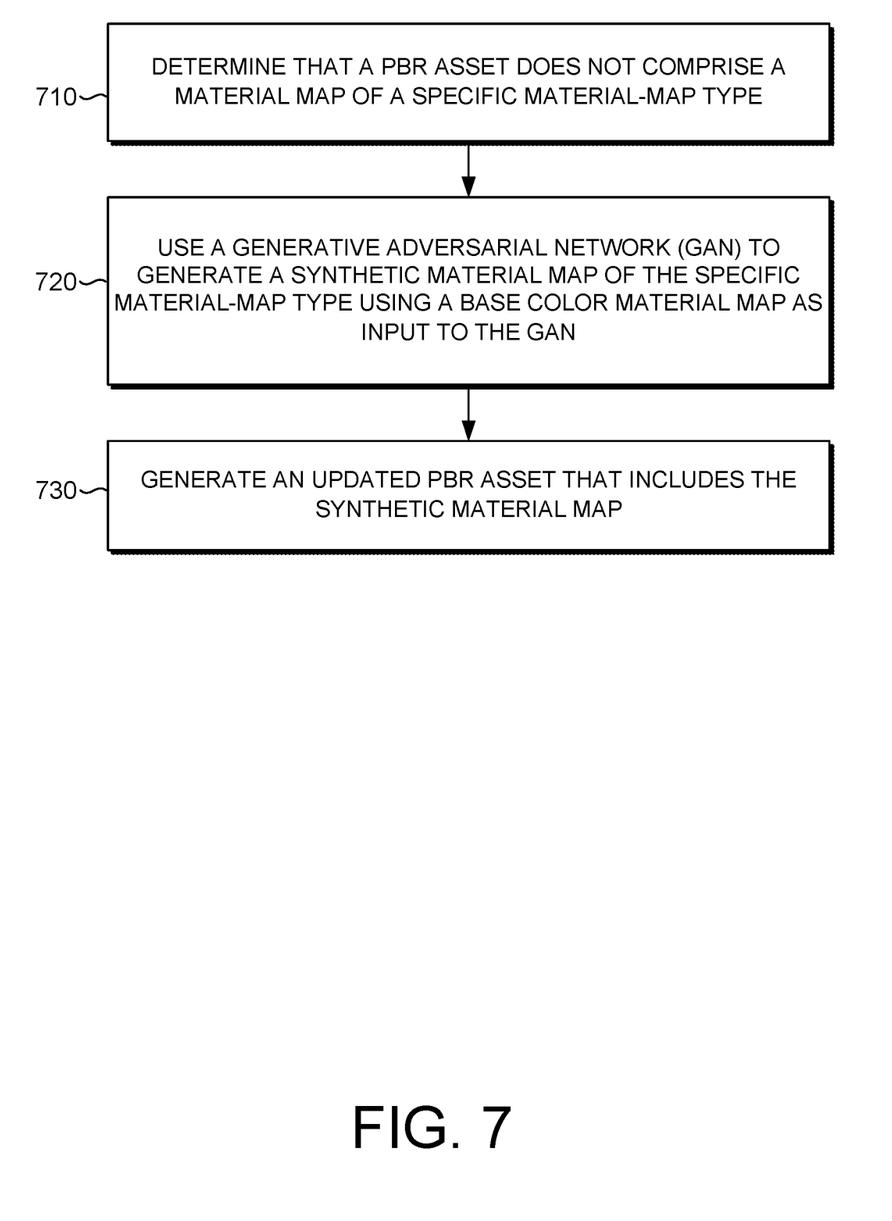
FIG. 7 provides a third example method of generating a material map that is absent from a PBR asset, in accordance with embodiments of the technology described herein.

Now referring to FIGS. 5-7, each block of methods 500, 600, and 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 500, 600, and 700 are described, by way of example, with respect to the view synthesis engine 110 of FIG. 2 and additional features of FIGS. 3 and 4. However, these methods may additionally or alternatively be executed by any one system, or any combination of systems, including, but not limited to, those described herein.

FIG. 5 is a flow diagram showing a method 500 for assigning a type to unknown material maps in a PBR asset, in accordance with some embodiments of the present disclosure. The method 500, at block 510 includes determining that a material map associated with a PBR asset is not associated with any material-map type. The method 500, at block 520 includes assigning a material-map type to the material map from a classification of an image content of the material map produced by a machine classifier. The method 500, at block 530 includes generating an updated PBR asset that includes the material map designated as the material-map type.

FIG. 6 is a flow diagram showing a method 600 for correlating material maps in a PBR asset, in accordance with some embodiments of the present disclosure. The method 600, at block 610 includes determining that a plurality of material maps in a PBR asset are not correlated. The method 600, at block 620 includes assigning a preliminary material-map type to each of the plurality of material maps using a machine classifier. The method 600, at block 630 includes selecting as a seed for a material cluster a base-color material map. The method 600, at block 640 includes calculating a similarity score for each remaining material map in the plurality of material maps, the similarity score indicating an amount of similarity to the base-color material map. The method 600, at block 650 includes adding one material map of each material-map type represented in the plurality of material maps to the material cluster using strength of similarity to the base-color material map as measured by the similarity score. The method 600, at block 660 includes generating an updated PBR asset that includes correlation information that groups the base-color material map with other material maps in the material cluster.

FIG. 7 is a flow diagram showing a method 700 for generating a material map that is absent from a PBR asset, in accordance with some embodiments of the present disclosure.

Exemplary Operating Environment

Figure 8:
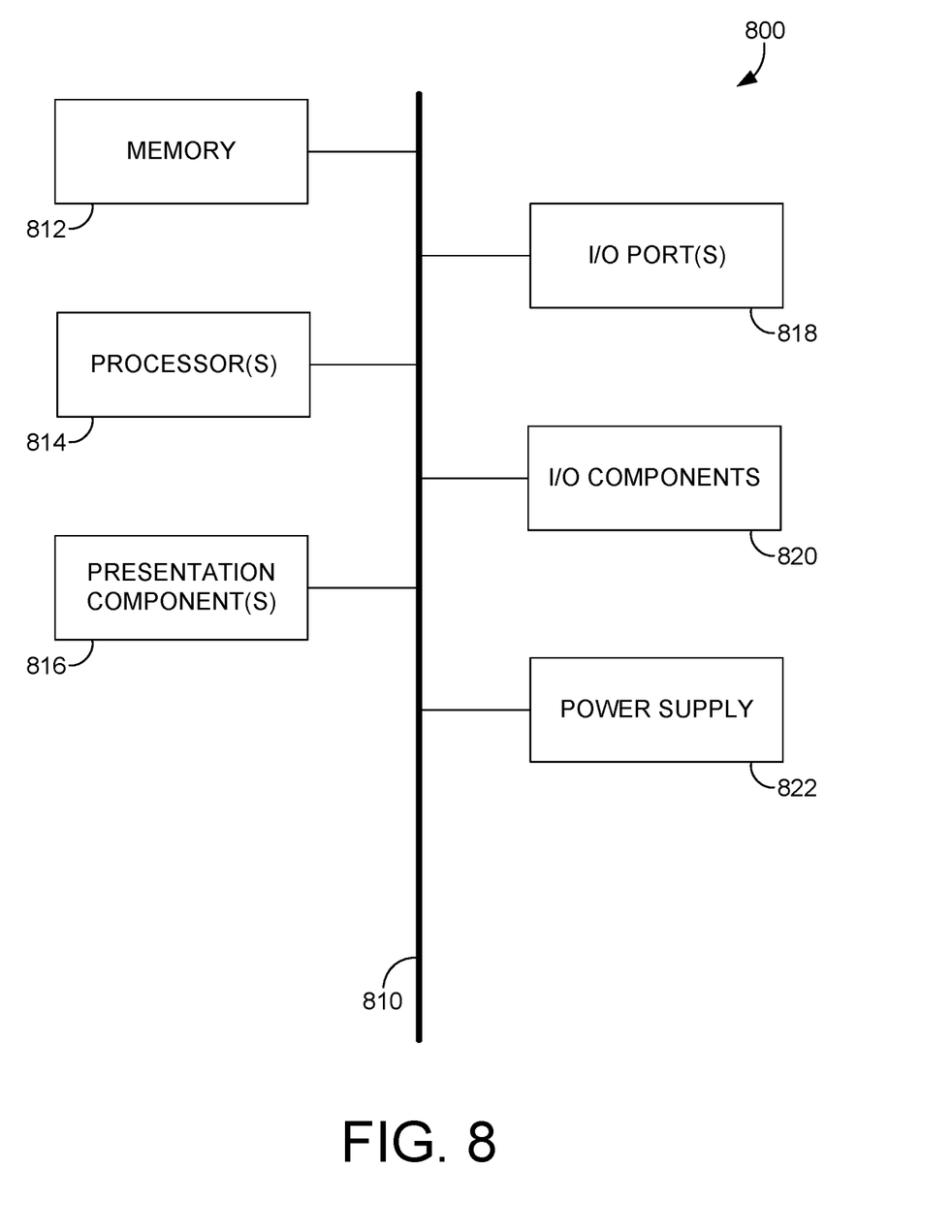
FIG. 8 is a block diagram of an example computing environment suitable for use in implementing embodiments of the technology described herein.

Having briefly described an overview of embodiments of the present invention, an example operating environment in which embodiments of the present invention may be implemented is described below in order to provide a general context for various embodiments of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are contemplated. For example, one may consider a presentation component such as a display device to be an I/O component. In addition, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine-learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine learning is a field of study that gives computers the ability to learn without being explicitly programmed. Machine learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combination of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments that are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for assigning a type to unknown material maps in a PBR asset, the method comprising:
   determining that a material map associated with a PBR asset is not associated with any material-map type;
   assigning a material-map type to the material map from a classification of an image content of the material map produced by a machine classifier; and
   generating an updated PBR asset that includes the material map designated as the material-map type.

2. The method of claim 1, wherein any meta data associated with the material map is not used to assign the material-map type to the material map.

3. The method of claim 1, wherein the machine classifier is a convolutional neural network trained to recognize multiple material-map types.

4. The method of claim 1, wherein the method further comprises:
   determining that a plurality of material maps associated with the PBR asset are not associated with any material-map type;
   determining that each material map in the plurality of material maps forms part of a single material definition; and
   assigning a material-map type to each material map in the plurality of material maps using a result of a joint probability analysis performed by the machine classifier.

5. The method of claim 1, wherein the method further comprises:
   determining that a plurality of material maps associated with the PBR asset are not associated with any material-map type;
   clustering a subset of the plurality of material maps that form a single material definition; and assigning a material-map type to each material map in the subset of the plurality of material maps using a result of a joint probability analysis performed by the machine classifier.

6. The method of claim 1, wherein the material-map type is selected from a group consisting of base color, normal, roughness, metallic, or glow.

7. The method of claim 1, wherein the method further comprises:
 determining that the PBR asset does not comprise a material map of a specific material-map type; and
 using a Generative Adversarial Network to generate a synthetic material map of the specific material-map type using a base-color material map as input.

8. One or more computer-storage media having computer-executable instructions embodied thereon that, when executed by a computing system having a processor and memory, cause the computing system to correlate material maps in a PBR asset:
 determining that a plurality of material maps in a PBR asset are not correlated;
 assigning a preliminary material-map type to each of the plurality of material maps using a machine classifier;
 selecting as a seed for a material cluster a base-color material map;
 calculating a similarity score for each remaining material map in the plurality of material maps, the similarity score indicating an amount of similarity to the base-color material map;
 adding one material map of each material-map type represented in the plurality of material maps to the material cluster using strength of similarity to the base-color material map as measured by the similarity score; and
 generating an updated PBR asset that includes correlation information that groups the base-color material map with other material maps in the material cluster.

9. The media of claim 8, wherein the method further comprise generating an embedding of each of the plurality of material maps and wherein the similarity score is calculated using the embedding.

10. The media of claim 8, wherein the method further comprises:
 assigning a final material-map type to each material map in the material cluster using a result of a joint probability analysis performed by the machine classifier.

11. The media of claim 10, wherein the machine classifier does not use the joint probability analysis when assigning the preliminary material-map type to each of the plurality of material maps using wherein the threshold amount is four.

12. The media of claim 8, wherein the determining that the plurality of material maps are not correlated comprises determining that the plurality of material maps comprise multiple base-color material maps.

13. The media of claim 8, wherein the determining that the plurality of material maps are not correlated comprises determining that an amount of material maps in the plurality of material maps exceeds a threshold amount.

14. The media of claim 8, wherein the material-map type is selected from a group consisting of base color, normal, roughness, metallic, or glow.

15. The method of claim 8, wherein the method further comprises:
 determining that the PBR asset does not comprise a material map of a specific material-map type; and
 using a Generative Adversarial Network to generate a synthetic material map of the specific material-map type using the base-color material map as input.

16. A method of generating a material map that is absent from a PBR asset comprising:
 determining that a PBR asset does not comprise a material map of a specific material-map type;
 using a Generative Adversarial Network (GAN) to generate a synthetic material map of the specific material-map type using a base-color material map as input to the GAN; and
 generating an updated PBR asset that includes the synthetic material map.

17. The method of claim 16, wherein determining that the PBR asset does not comprise a material map of the specific material-map type comprises determining that less than a threshold amount of material maps are present in the PBR asset.

18. The method of claim 17, wherein the threshold amount is four.

19. The method of claim 16, wherein determining that the PBR asset does not comprise the material map of the specific material-map type comprises determining that a material definition in the PBR asset comprises less than a threshold amount of material maps.

20. The method of claim 16, wherein the GAN generates the synthetic material map by minimizing loss against the base-color material map.

* * * * *

UNITED STATES PATENT AND TRADEMARK OFFICE
CERTIFICATE OF CORRECTION

| | |
|---|---|
| PATENT NO. | : 11,488,342 B1 |
| APPLICATION NO. | : 17/332708 |
| DATED | : November 1, 2022 |
| INVENTOR(S) | : Kalyan Krishna Sunkavalli et al. |

It is certified that error appears in the above-identified patent and that said Letters Patent is hereby corrected as shown below:

In the Claims

Claim 15, Column 20, Line 15:
In the line reading "15. The method of claim 8, wherein the method further" should read --15. The media of claim 8, wherein the method further--.

Signed and Sealed this
Seventh Day of March, 2023

Katherine Kelly Vidal
*Director of the United States Patent and Trademark Office*